(12) United States Patent
Nagata

(10) Patent No.: US 9,722,899 B2
(45) Date of Patent: Aug. 1, 2017

(54) INTERRUPTION CAUSE DETERMINATION DEVICE, INTERRUPTION CAUSE DETERMINATION METHOD, AND RECORDING MEDIUM STORED WITH AN INTERRUPTION CAUSE DETERMINATION PROGRAM

(71) Applicant: FUJITSU LIMITED, Kawasaki-shi, Kanagawa (JP)

(72) Inventor: Nami Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/727,013

(22) Filed: Jun. 1, 2015

(65) Prior Publication Data

US 2015/0263920 A1 Sep. 17, 2015

Related U.S. Application Data

(63) Continuation of application No. PCT/JP2012/083729, filed on Dec. 26, 2012.

(51) Int. Cl.
*H04L 12/26* (2006.01)
*H04B 17/17* (2015.01)
*H04B 17/336* (2015.01)

(52) U.S. Cl.
CPC ......... *H04L 43/0847* (2013.01); *H04B 17/17* (2015.01); *H04B 17/336* (2015.01); *H04L 43/16* (2013.01)

(58) Field of Classification Search
None
See application file for complete search history.

(56) References Cited

U.S. PATENT DOCUMENTS

| | | | |
|---|---|---|---|
| 5,889,488 A | 3/1999 | Kosaki | |
| 8,005,030 B2 * | 8/2011 | Stephenson | H04W 24/08 370/310 |

(Continued)

FOREIGN PATENT DOCUMENTS

| | | |
|---|---|---|
| JP | 10-70504 | 3/1998 |
| JP | 2007-49630 | 2/2007 |

(Continued)

OTHER PUBLICATIONS

International Search Report mailed on Mar. 19, 2013 in corresponding International Patent Application No. PCT/JP2012/083729.

(Continued)

*Primary Examiner* — Min Jung
(74) *Attorney, Agent, or Firm* — Staas & Halsey LLP

(57) ABSTRACT

An interruption cause determination device comprising: acquiring in the memory a radio wave reception strength (RWRS) and a packet error rate (PRE) of a wireless link, and estimating a characteristic curve of the PRE against RWRS that passes through a point corresponding to a combination of values of the RWRS and the PRE at a first point in time a specific amount of time earlier than a second point in time at which the acquired PRE of the wireless link reached a threshold value or greater, under the assumption that the interference power at the first point in time is maintained; and determining the cause of interruption based on a positional relationship of a point corresponding to a combination of values of the RWRS and the PRE at the second point in time, with respect to the estimated characteristic curve of the PRE against RWRS.

20 Claims, 12 Drawing Sheets

(56) References Cited

U.S. PATENT DOCUMENTS

| | | | | |
|---|---|---|---|---|
| 2004/0028003 | A1* | 2/2004 | Diener | H04L 1/0001 370/319 |
| 2005/0169410 | A1* | 8/2005 | Tanaka | H04L 1/203 375/346 |
| 2005/0233700 | A1* | 10/2005 | Pecen | H04W 88/06 455/67.11 |
| 2009/0052332 | A1* | 2/2009 | Fukuyama | H04L 41/06 370/242 |
| 2009/0227251 | A1* | 9/2009 | Lei | H04J 11/0069 455/425 |
| 2009/0264119 | A1* | 10/2009 | De Pomian | H04W 24/08 455/424 |
| 2010/0153787 | A1* | 6/2010 | Beattie, Jr. | H04L 41/0681 714/43 |
| 2015/0009846 | A1* | 1/2015 | Gacanin | H04B 17/00 370/252 |

FOREIGN PATENT DOCUMENTS

| | | |
|---|---|---|
| JP | 2010-239239 | 10/2010 |
| JP | 2011-193086 | 9/2011 |
| JP | 2012-74765 | 4/2012 |

OTHER PUBLICATIONS

Yoneyama et al., "Design and evaluation of the performance-degradation estimation method at a wireless network," The Institute of Electronics, Information and Communication Engineers, Technical Report, Sep. 2008, pp. 123-128.

Senda, "A Proposal of a Fault Monitoring System by Passive measurement for Ad-hoc Networks", Information Processing Society of Japan, SIG Technical Report, Mar. 13, 2012, pp. 1-7.

Patent Abstracts of Japan, Publication No. 2011-193086, published Sep. 29, 2011.

Patent Abstracts of Japan, Publication No. 2010-239239, published Oct. 21, 2010.

Patent Abstracts of Japan, Publication No. 10-70504, published Mar. 10, 1998.

Patent Abstracts of Japan, Publication No. 2007-49630, published Feb. 22, 2007.

Patent Abstracts of Japan, Publication No. 2012-74765, published Apr. 12, 2012.

* cited by examiner

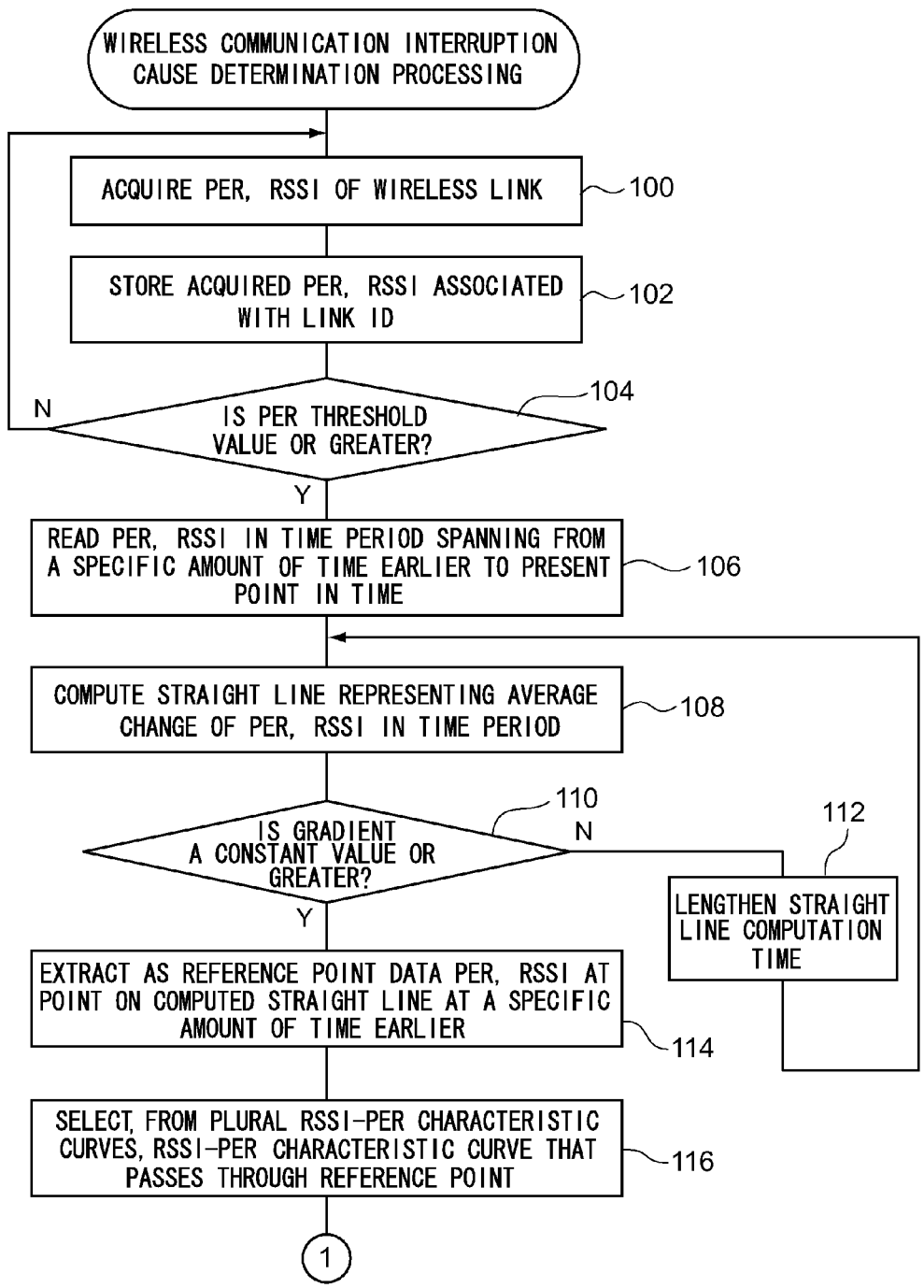

INTERRUPTION CAUSE DETERMINATION DEVICE, INTERRUPTION CAUSE DETERMINATION METHOD, AND RECORDING MEDIUM STORED WITH AN INTERRUPTION CAUSE DETERMINATION PROGRAM

CROSS-REFERENCE TO RELATED APPLICATION

This application is a continuation application of International Application No. PCT/JP2012/083729, filed Dec. 26, 2012, the disclosure of which is incorporated herein by reference in its entirety.

FIELD

A certain aspect of the embodiments discussed herein is related to an interruption cause determination device, an interruption cause determination method, and a recording medium stored with an interruption cause determination program.

BACKGROUND

In operation maintenance of a wireless network, causes of interruption occurring in wireless links can be broadly categorized as being either a drop in reception power due to effects of an obstacle or the like (worsening of the radio wave propagation environment), or an increase in radio wave interference. However, determining the inference cause when interruption occurs in a wireless link requires knowledge and experience. There is accordingly a need for automatic determination of the interruption cause employing received signal strength indicator (RSSI) and a packet error rate (PER), these being general parameters that evaluate wireless link performance. Satisfying this need would enable the burden of operation maintenance for wireless networks to be reduced.

Technology related to the above has been proposed in which, for cases in which the packet loss rate (packet error rate) is a threshold value or above, the cause of the interruption is determined to be a worsening of the radio wave propagation environment when an evaluation value for the radio wave reception strength is the threshold value or less, and the cause of the interruption is determined to be radio wave interference when the evaluation value for the radio wave reception strength is greater than the threshold value. In this technology, as illustrated in FIG. 10, coordinate space of the packet error rate against radio wave reception strength is divided into four quadrants by a threshold value of radio wave reception strength 150 and a threshold value of the packet error rate 152. A second quadrant is set as a region for determining that the radio wave propagation environment has worsened, and a first quadrant is a region is set as a region for determining that there is radio wave interference.

RELATED NON-PATENT DOCUMENTS

Non-Patent Document 1: Shuuichrou CHIDA, Hirohito NISHIYAMA, *Proposed Method for Interruption Management of Ad Hoc Networks*, Information Processing Society of Japan Research Report, 29 Aug. 2011, Vol 12011-MBL-59 (1)

SUMMARY

According to an aspect of the embodiments, an interruption cause determination device includes a memory and a processor configured to execute a procedure. The procedure includes: acquiring, in the memory, a radio wave reception strength and a packet error rate of a wireless link, and estimating a characteristic curve of the packet error rate against the radio wave reception strength that passes through a point corresponding to a combination of values of the radio wave reception strength and the packet error rate at a first point in time that is a specific amount of time earlier than a second point in time at which the acquired packet error rate of the wireless link reaches a threshold value or greater, under the assumption that the interference power at the first point in time is maintained; and determining the cause of interruption based on a positional relationship of a point corresponding to a combination of values of the radio wave reception strength and the packet error rate at the second point in time, with respect to the estimated characteristic curve of the packet error rate against the radio wave reception strength.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a flowchart illustrating an example of content of wireless communication interruption cause determination processing.

DESCRIPTION OF EMBODIMENTS

Figure 1:
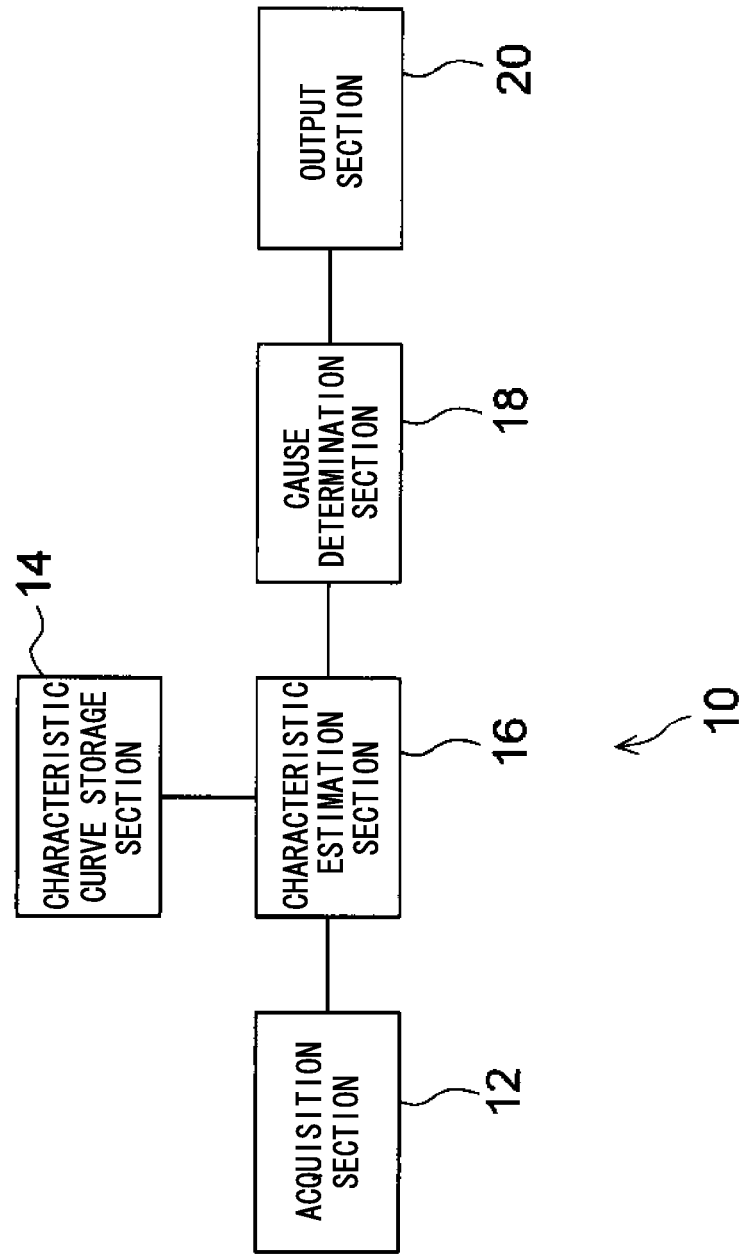
FIG. 1 is a functional block diagram of an interruption cause determination device explained in the present exemplary embodiment.

Detailed explanation follows regarding an example of an exemplary embodiment of technology disclosed herein with reference to the drawings. FIG. 1 illustrates an interruption cause determination device 10 according to the present exemplary embodiment. The interruption cause determination device 10 includes an acquisition section 12, a characteristic curve storage section 14, a characteristic estimation section 16, a cause determination section 18, and an output section 20.

Figure 2:
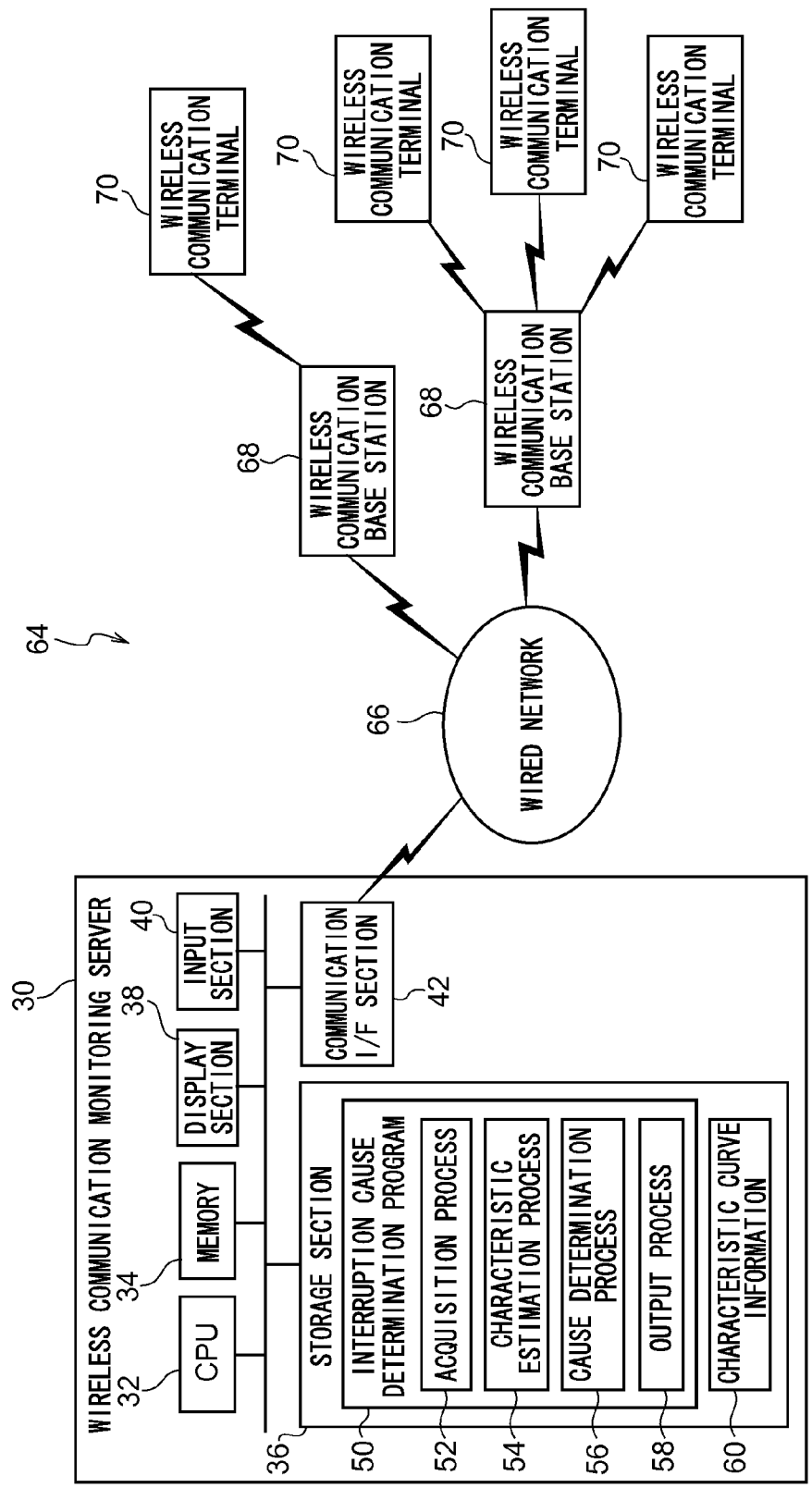
FIG. 2 is a block diagram illustrating a schematic configuration of a computer system including a wireless communications monitoring server capable of functioning as an interruption cause determination device.

In the present exemplary embodiment, wireless links are formed between wireless communication base stations 68 and respective wireless communication terminals 70 as illustrated in FIG. 2, and wireless communication is performed between the wireless communication base stations 68 and the respective wireless communication terminals 70. Wireless communication between the wireless communication base stations 68 and the respective wireless communication terminals 70 may, for example, be wireless communication conforming to any standard out of IEEE 802.11, which is a wireless LAN standard, Bluetooth (registered trademark), or any type of ZigBee. The acquisition section 12 acquires for each individual wireless link the received signal strength indicator (RSSI) and the packet error rate (PER), which are parameters for evaluating the performance of a wireless link. Each individual wireless link is identified by a link ID allocated thereto.

Plural characteristic curves of packet error rate against radio wave reception strength are pre-computed based on the assumption that interference power is maintained at mutually different values, and stored in the characteristic curve storage section 14 as characteristic curves of packet error rate against radio wave reception strength for wireless links. Computation of the characteristic curves for packet error rate against radio wave reception strength is described later.

When the packet error rate reaches a threshold value or greater in any wireless link, the characteristic estimation section 16 computes a straight line to represent an average variation in the packet error rate in a time period starting from (a first point in time) a specific amount of time earlier than the point in time when the packet error rate reached the specific threshold or greater (a second point in time). The characteristic estimation section 16 also computes a straight line to represent an average variation in radio wave reception strength in the duration starting from (the first point in time) the specific amount of time earlier than the second point in time. Then, from the plural characteristic curves of the packet error rate against radio wave reception strength stored in the characteristic curve storage section 14, the characteristic estimation section 16 selects a characteristic curve that passes through a point corresponding to a combination of the radio wave reception strength and the packet error rate equivalent to a point on the computed straight lines.

The cause determination section 18 then determines the cause of the interruption based on a positional relationship of a point corresponding to a combination of the radio wave reception strength at the second point in time and the packet error rate for the wireless link in which the packet error rate has reached the threshold value or greater with respect to the characteristic curve selected by the characteristic estimation section 16. The output section 20 then outputs the cause of the interruption determined by the cause determination section 18.

The interruption cause determination device 10 can be implemented by, for example, a wireless communication monitoring server 30 illustrated in FIG. 2. The wireless communication monitoring server 30 includes a CPU 32, memory 34, a nonvolatile storage section 36, a display section 38, an input section 40, and a wireless interface (I/F) section 42. The CPU 32, the memory 34, the storage section 36, the display section 38, the input section 40, and the communication I/F section 42 are connected to one another through a bus 44.

The wireless communication monitoring server 30 is included in a computer system 64, and is connected to a wired network 66 through the communication I/F section 42. The computer system 64 includes the plural wireless communication base stations 68 connected to the wired network 66, and the plural wireless communication terminals 70 that perform wireless communication with one of the wireless communication base stations 68. The wireless communication monitoring server 30 receives the parameters that evaluate the performance of the individual wireless links (the received signal strength indicator (RSSI) and the packet error rate (PER)) from the individual wireless communication base stations 68 over the wired network 66.

The storage section 36 of the wireless communication monitoring server 30 may be implemented by a hard disk drive (HDD), flash memory, or the like. An interruption cause determination program 50 that causes the wireless communication monitoring server 30 to function as the interruption cause determination device 10 is stored in the storage section 36 that serves as a recording medium. The CPU 32 reads the interruption cause determination program 50 from the storage section 36, expands the interruption cause determination program 50 into the memory 34, and sequentially executes processes included in the interruption cause determination program 50.

The interruption cause determination program 50 includes an acquisition process 52, a characteristic estimation process 54, a cause determination process 56, and an output process 58. The CPU 32 operates as the acquisition section 12 illustrated in FIG. 1 by executing the acquisition process 52. The CPU 32 operates as the characteristic estimation section 16 illustrated in FIG. 1 by executing the characteristic estimation process 54. The CPU 32 operates as the cause determination section 18 illustrated in FIG. 1 by executing the cause determination process 56. The CPU 32 operates as the output section 20 illustrated in FIG. 1 by executing the output process 58. Characteristic curve information 60 is also stored in the storage section 36. In this manner, the storage section 36 functions as an example of the characteristic curve storage section 14.

The wireless communication monitoring server 30 that executes the interruption cause determination program 50 thereby functions as the interruption cause determination device 10. Note that the interruption cause determination program 50 is an example of an interruption cause determination program according to technology disclosed herein.

The interruption cause determination device 10 may, for example, be implemented by an integrated semiconductor circuit, and more specifically, by an application specific integrated circuit (ASIC).

Figure 3B:
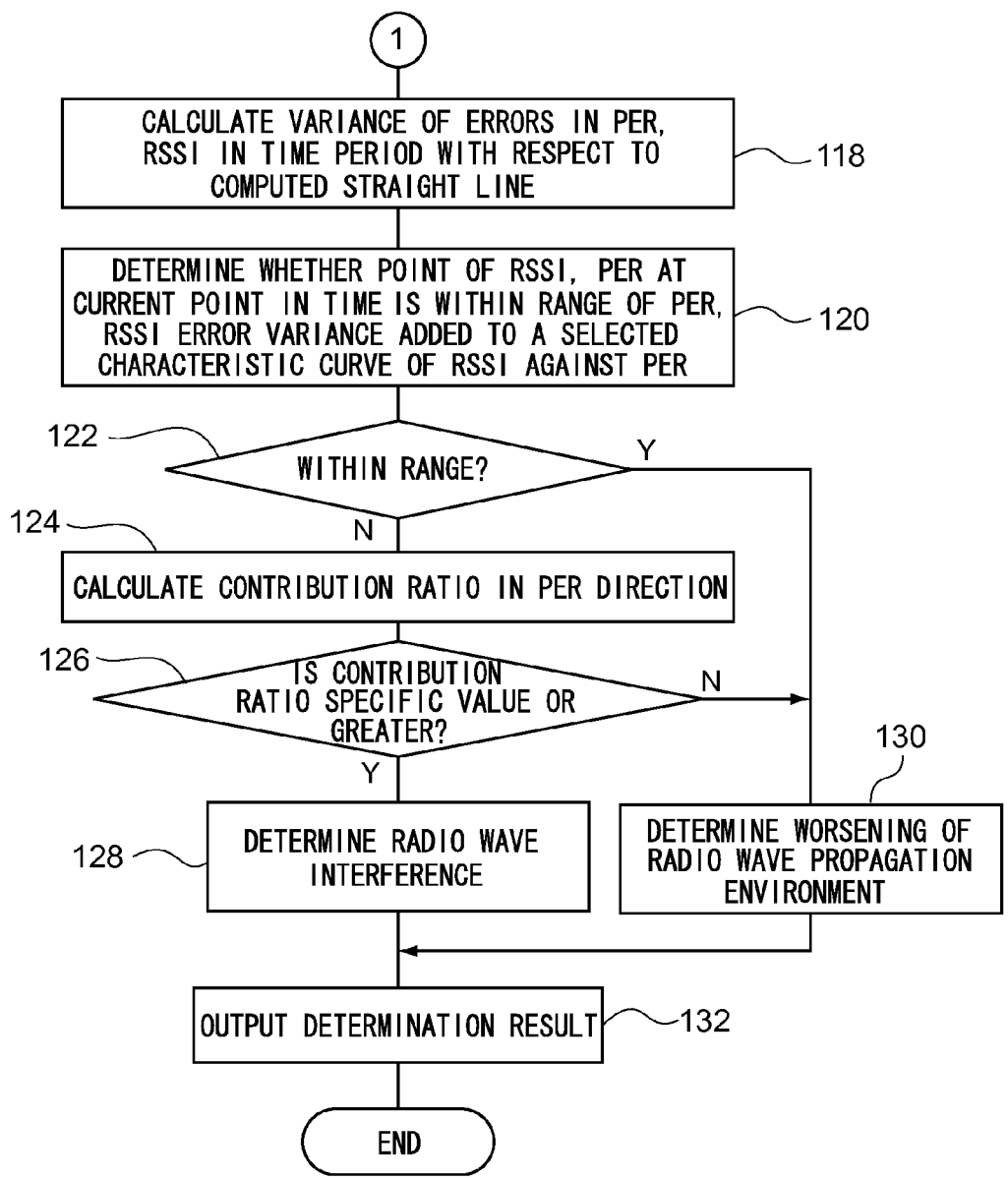
FIG. 3B is a flowchart illustrating an example of content of wireless communication interruption cause determination processing.

Next, as operation of the present exemplary embodiment, explanation follows regarding wireless communication interruption cause determination processing implemented by the CPU 32 executing the interruption cause determination program 50, with reference to FIG. 3A and FIG. 3B. At step 100 of the wireless communication interruption cause determination processing, the acquisition section 12 acquires the received signal strength indicator (RSSI) and the packet error rate (PER) of a wireless link formed between a freely selected wireless communication base station 68 and a freely selected wireless communication terminal 70. Next, at step 102, the acquisition section 12 stores the acquired radio wave reception strength and the packet error rate acquired at step 100 in the storage section 36, in association with the link ID allocated to the corresponding wireless link and the current time.

Next, at step 104, the characteristic estimation section 16 determines whether or not the packet error rate acquired by the acquisition section 12 at step 100 is the threshold value or greater. When negative determination is made at step 104, processing returns to step 100 since determination can be made that no interruption is occurring in the corresponding wireless link, and the acquisition section 12 acquires the radio wave reception strength and the packet error rate of another of the formed wireless links. In this manner, when interruption is not occurring in any of the wireless links, the acquisition section 12 repeats the acquisition of the radio wave reception strength and the packet error rate of the wireless link at intervals of a fixed period of time.

When the packet error rate of any of the wireless links has reached the threshold value or greater, the determination of step 104 is affirmative and processing transitions to step 106. At step 106, the characteristic estimation section 16 reads from the storage section 36 the radio wave reception strength and the packet error rate of the corresponding wireless link, for the time period spanning from the point in time (the first point in time) a specific amount of time earlier than when the packet error rate reached the threshold value or greater (the second point in time) up to the second point in time. For example, in a configuration in which the interval of periods of time for acquiring the radio wave reception strength and the packet error rate for the individual wireless links is a value T (for example, 10 minutes), and in which the packet error rate is allowed to reach the threshold value or above once every two times, then the specific amount of time mentioned above may be set to a value of approximately 2T (for example, 20 minutes).

Figure 4A:
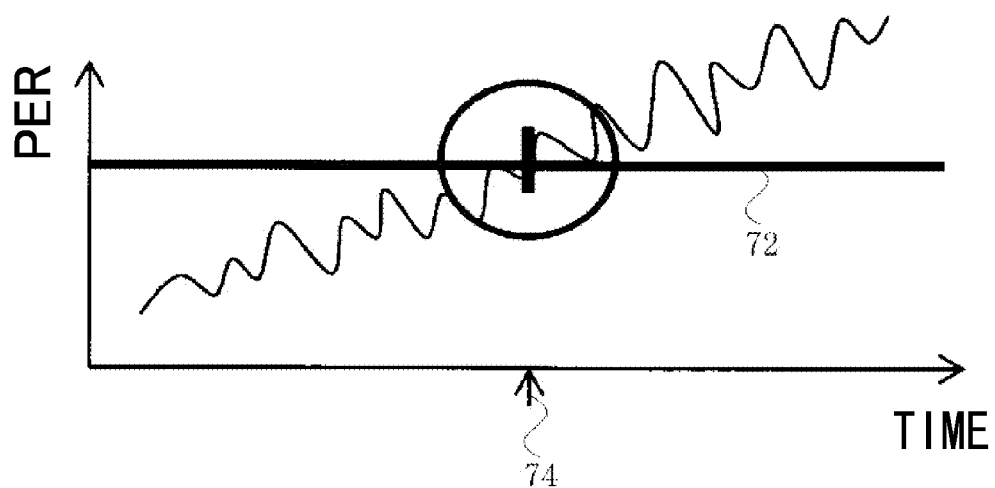
FIG. 4A is an explanatory diagram for explaining computation of a straight line representing average change in packet error rate and radio wave reception strength in a specific time period.
Figure 4B:
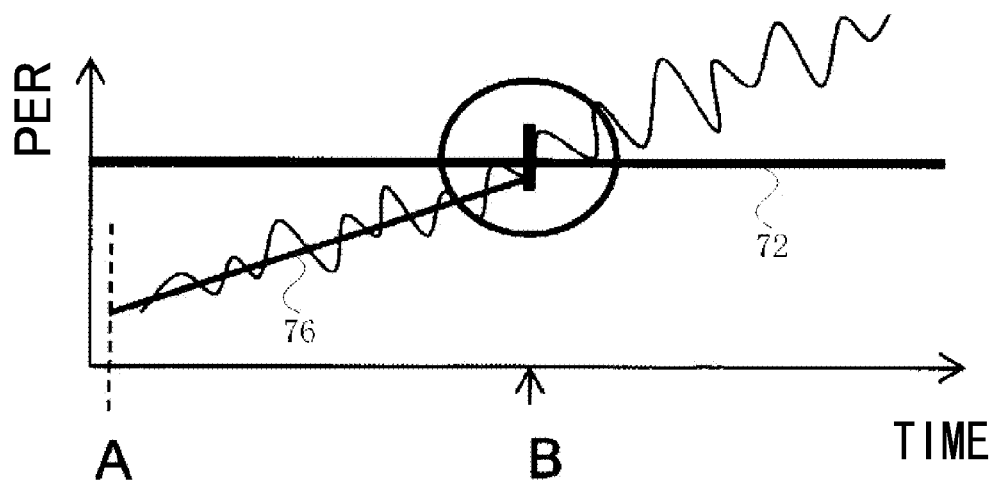
FIG. 4B is an explanatory diagram for explaining computation of a straight line representing average change in packet error rate and radio wave reception strength in a specific time period.

As illustrated in FIG. 4A, the instantaneous values of the packet error rate and the radio wave reception strength read from the storage section 36 at step 106 fluctuate on a small scale in time series thereof, due to effects such as fading. Although the packet error rate is plotted in FIG. 4A, small scale fluctuations due to effects such as fading also arise in the radio wave reception strength. Thus, at the next step 108, the characteristic estimation section 16 computes a straight line representing average changes (trends) in the packet error rate and the radio wave reception strength in the time period spanning from the first point in time to the second point in time in order to eliminate errors due to employing instantaneous values of the packet error rate and the radio wave reception strength. FIG. 4B illustrates an example of the straight line computed at step 108. Reference numerals "72" in FIG. 4A and FIG. 4B indicate examples of the interruption determination threshold value. Reference numeral "74" in FIG. 4A indicates an example of the boundary at which the interruption determination result changes. Reference numeral "76" in FIG. 4B indicates an example of an average change (trend) of data for past radio wave reception strengths.

In the next step 110, the characteristic estimation section 16 determines whether or not the gradient of the straight line computed at step 108 is a constant value or greater. Processing transitions to step 114 when the determination of step 110 is affirmative, and processing transitions to step 112 when the determination of step 110 is negative. At step 112, the characteristic estimation section 16 sets a longer interval of time from the first point in time to the second point in time, and processing returns to step 108. The computation durations for the straight lines representing the average changes (trends) in the packet error rate and the radio wave reception strength are thereby extended at step 108, and the straight lines are recomputed.

At the next step 114, the characteristic estimation section 16 extracts, as reference points, the packet error rate and the radio wave reception strength that are positioned on the straight line computed at step 108, and acquired at a timing near to the first point in time (a specific amount of time earlier than the second point in time) (the timing denoted "A" in FIG. 4B). Data is thereby acquired, as reference point data, in which errors due to effects such as fading have been eliminated.

Figure 5:
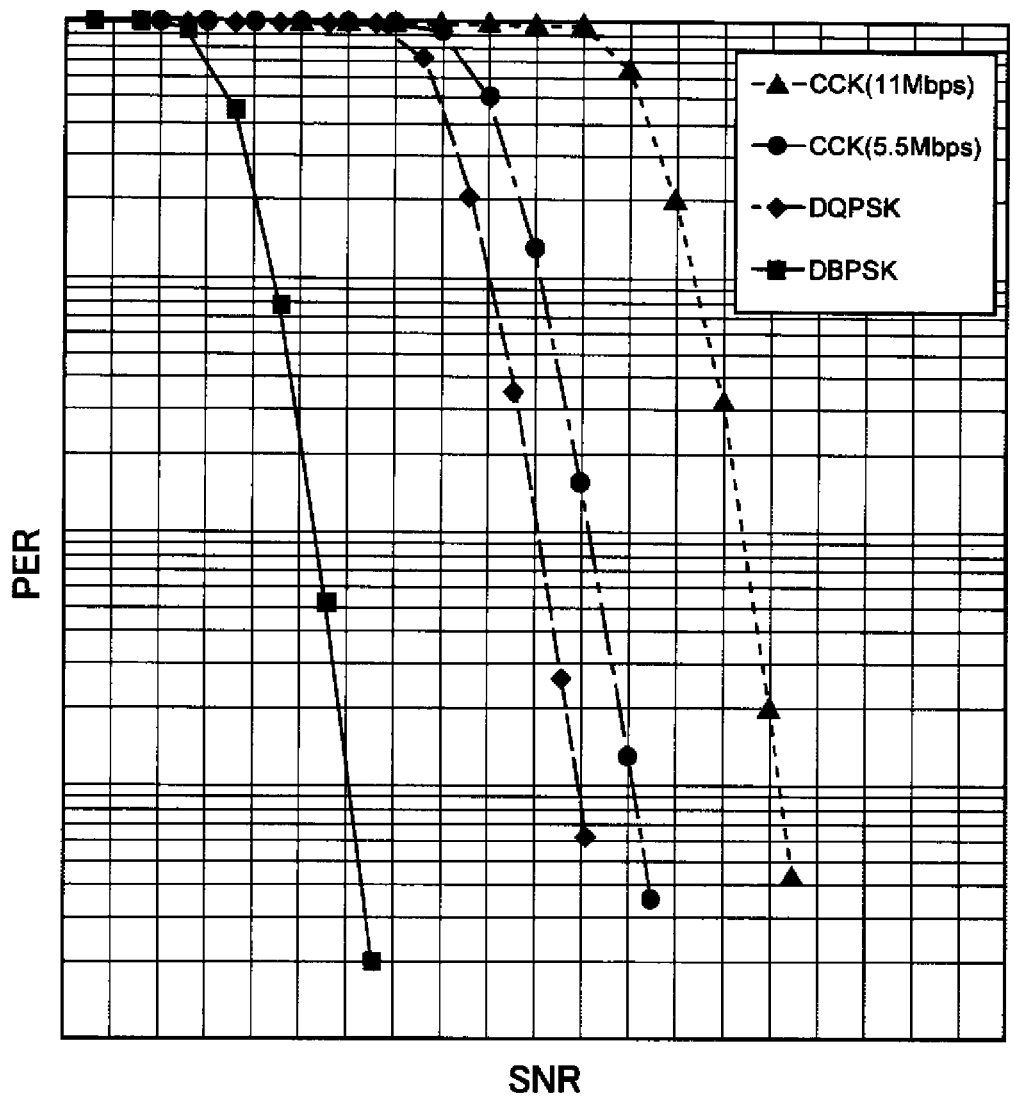
FIG. 5 is a line graph illustrating an example of a characteristic curve of packet error rate PER against signal-to-noise power ratio SNR in a receiver.

Explanation follows regarding the plural characteristic curves of the packet error rate against radio wave reception strength stored in the characteristic curve storage section 14. FIG. 5 illustrates an example of a characteristic curve of the packet error rate (PER) against signal-to-noise power ratio (SNR) in a wireless LAN (IEEE 802.11b) receiver. The characteristic curves of packet error rate against signal-to-noise power ratio of the receiver illustrated in FIG. 5 can be derived by calculation or simulation. The received signal strength indicator RSSI is found using Equation (1) below, wherein S is reception power, I is interference power, and N is noise power.

$$RSSI = S + I + N \qquad (1)$$

The shape of curve depicted by the packet error rate against radio wave reception strength when the packet error rate reaches the threshold value or greater is unknown, since the interference power I is not fixed.

When there is no radio wave interference (when the interference power I=0), the relationship between the signal-to-noise power ratio SNR and the received signal strength indicator RSSI is that of Equation (2) below, since the received signal strength indicator RSSI=S+Nf (where Nf is the noise floor).

$$\frac{S}{N} = \frac{RSSI - Nf}{Nf} \qquad (2)$$

When radio wave interference is present (when the interference power I>0), the relationship between the signal-to-noise power ratio SNR and the received signal strength indicator RSSI is that of Equation (3) below, since the received signal strength indicator RSSI=S+Nf+I, and the reception power S=RSSI−Nf−I (the interference power I appears as noise in the reception power S).

$$\frac{S}{N} = \frac{RSSI - (Nf + I)}{Nf + I} \qquad (3)$$

Figure 6:
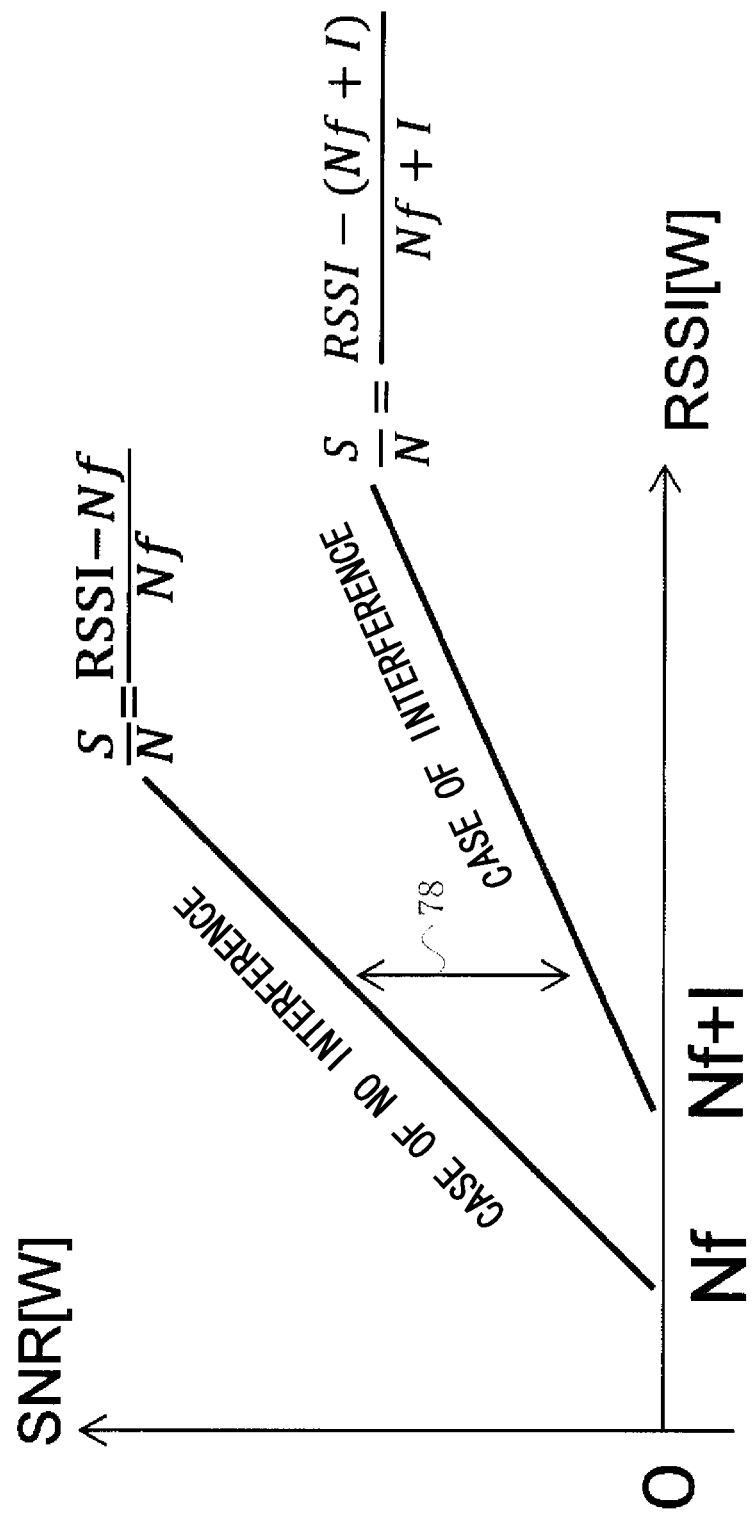
FIG. 6 is a line graph illustrating a relationship between signal-to-noise power ratio SNR and received signal strength indicator RSSI.
Figure 7:
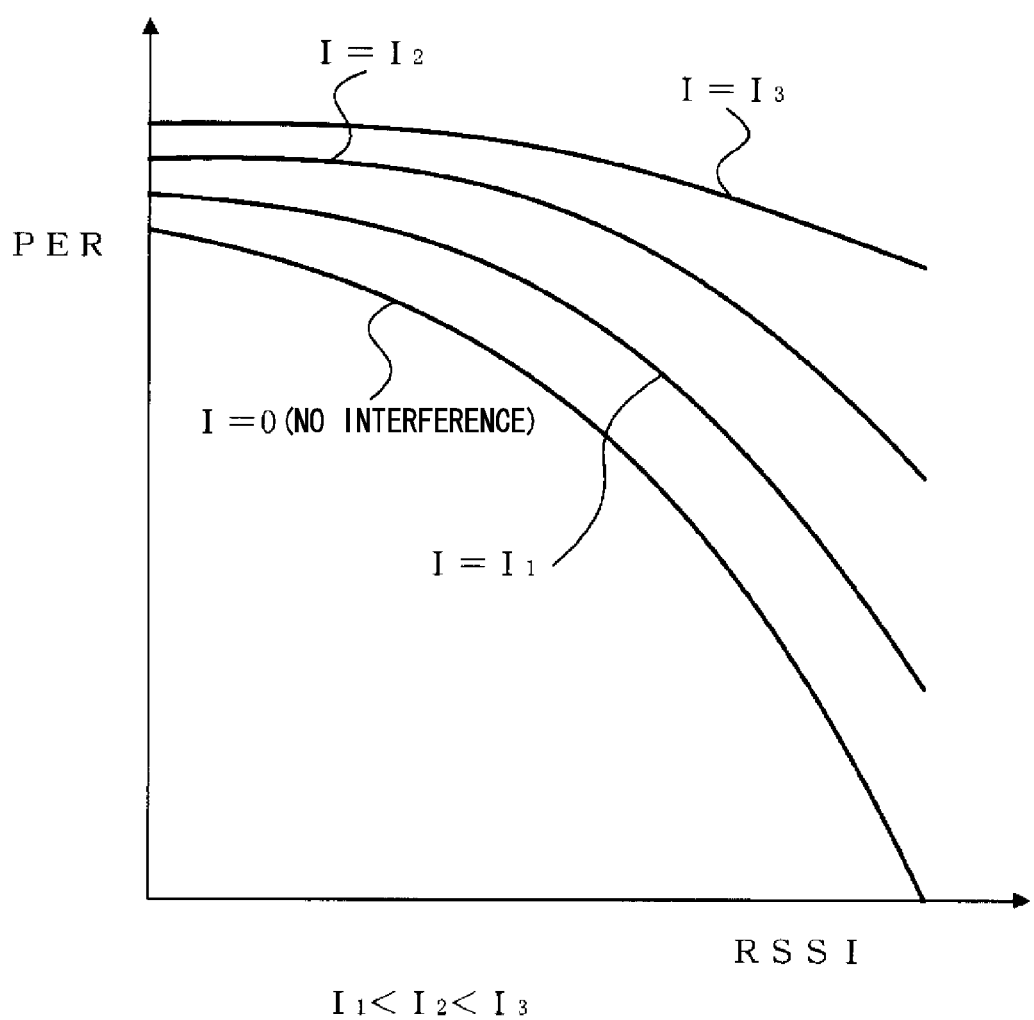
FIG. 7 is a line graph illustrating an example of a plural characteristic curves of packet error rate PER against received signal strength indicator RSSI.

The relationship between the signal-to-noise power ratio SNR and the received signal strength indicator RSSI expressed by Equation (2) and Equation (3) above is plotted in FIG. 6. The received signal strength indicator RSSI can thus be calculated from the signal-to-noise power ratio SNR using Equation (2) or Equation (3) by assuming the interference power I is a given value. Therefore, in the present exemplary embodiment, the signal-to-noise power ratio SNR of the characteristic curve of the packet error rate PER against signal-to-noise power ratio SNR is computed at the received signal strength indicator RSSI for plural mutually different interference powers, using Equation (2) when the interference power I=0, and using Equation (3) when the interference power I>0. As illustrated in the example of FIG. 7, plural characteristic curves of packet error rate against radio wave reception strength are thereby pre-calculated at mutually different interference powers, and the plural computed characteristic curves of packet error rate against radio wave reception strength are stored in the characteristic curve storage section 14.

The reference numeral "78" in FIG. 6 represents divergence of the relationship between the SNR and the RSSI when the interference power I>0 from the relationship between the SNR and the RSSI when the interference power I=0, with the divergence increasing as the interference power I increases.

At the next step 116, the characteristic estimation section 16 selects, from the plural characteristic curves of packet error rate against radio wave reception strength stored in the characteristic curve storage section 14, the characteristic curve of packet error rate against radio wave reception strength that passes through the point of the reference point data extracted at step 114. The individual characteristic curves of the packet error rate against radio wave reception strength stored in the characteristic curve storage section 14 are computed by assuming mutually different constant values for the interference power. Accordingly, the characteristic curve of the packet error rate against radio wave reception strength that passes through the point corresponding to the combination of the values of the radio wave reception strength and the packet error rate at the first point in time is estimated by step 116 under the assumption that the interference power at the first point in time is maintained.

At the next step 118, the cause determination section 18 takes as a reference a straight line representing the average change in the packet error rate and radio wave reception strength in the time period spanning from the first point in time to the second point in time, and calculates the variance (scatter width) of errors in the packet error rate and radio wave reception strength during the time period.

Figure 8:
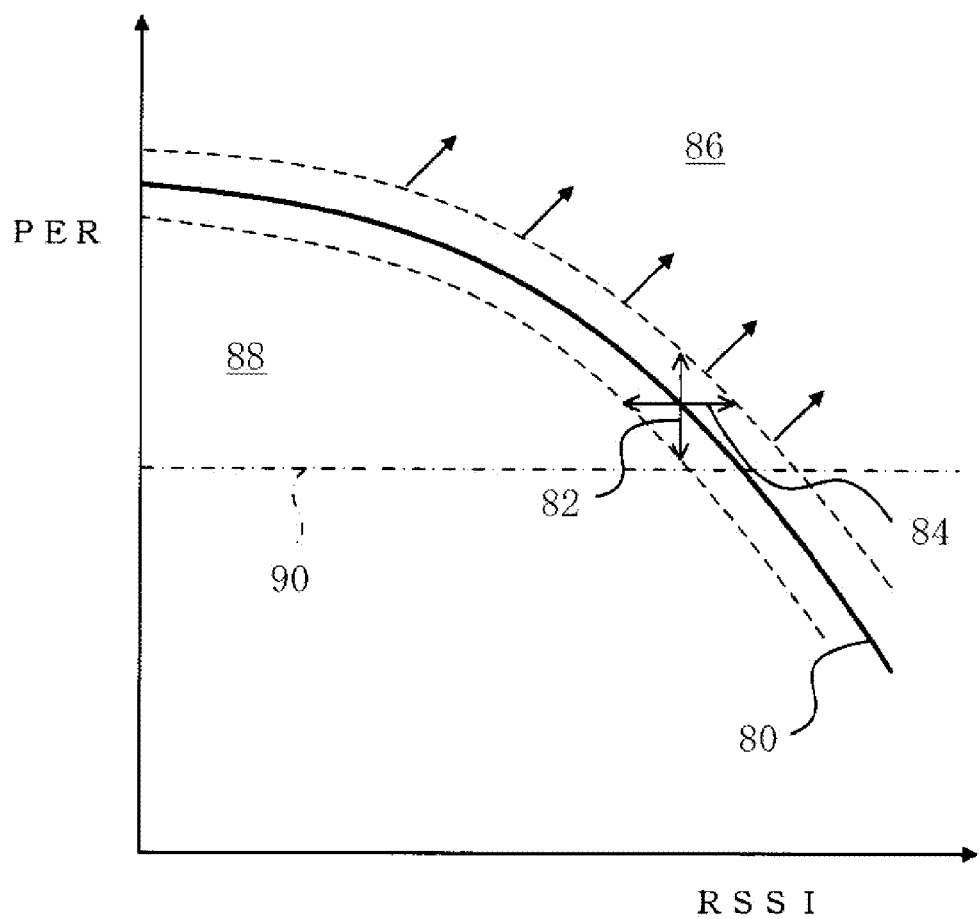
FIG. 8 is a line graph for explaining determination of an interruption cause from a characteristic curve of packet error rate PER against received signal strength indicator RSSI.

At the next step 120, as illustrated in FIG. 8, the cause determination section 18 sets, as a permissible range, a range of width 82, corresponding to the calculated error variance of the packet error rate, in the direction of the packet error rate for a characteristic curve 80 of the packet error rate against radio wave reception strength selected by the characteristic estimation section 16. Moreover, as illustrated in FIG. 8, the cause determination section 18 sets, as a permissible range, a range of width 84, corresponding to the calculated error variance of the radio wave reception strength, in the direction of the radio wave reception strength of the characteristic curve 80 of the packet error rate against radio wave reception strength selected by the characteristic estimation section 16. In FIG. 8, the reference numeral 86 indicates a region in which "radio wave interference" is determined, the reference numeral 88 indicates a region in which "worsening of the radio wave propagation environment" is determined, and the reference numeral 90 indicates an interruption determination threshold value. The cause determination section 18 then determines whether or not the position of the point corresponding to the combination of the values of the radio wave reception strength and the packet error rate at the current point in time (the second point in time) is within the permissible range (in the region indicated by the dashed lines in FIG. 8) set for the characteristic curve of the packet error rate against radio wave reception strength.

At the next step 122, the cause determination section 18 branches according to the determination result of step 120. When the position of the point corresponding to the combination of the values of the radio wave reception strength and the packet error rate at the current point in time lies within the permissible range set for the characteristic curve of the packet error rate against radio wave reception strength, determination is made that the interference power I has not changed significantly since the first point in time a specific amount of time earlier than the current time. Processing therefore transitions from step 122 to step 130 in such cases, and the cause determination section 18 determines that the cause for the interruption occurring in the wireless link (of the packet error rate reaching the threshold value or greater) is a worsening of the radio wave propagation environment.

When the position of the point corresponding to the combination of the values of the radio wave reception strength and the packet error rate at the current point in time is offset in the direction of increased error rate from the set permissible range for the characteristic curve of the packet error rate against radio wave reception strength, processing transitions from step 122 to step 124. In such cases, although there is a possibility that the interference power I has increased since the first point in time, at the same time the possibility that a worsening of the radio wave propagation environment has arisen is also not refutable. Therefore, at the next step 124, processing is performed to eliminate causes of interruption arising in the wireless link (of the packet error rate reaching the threshold value or greater).

Figure 9:
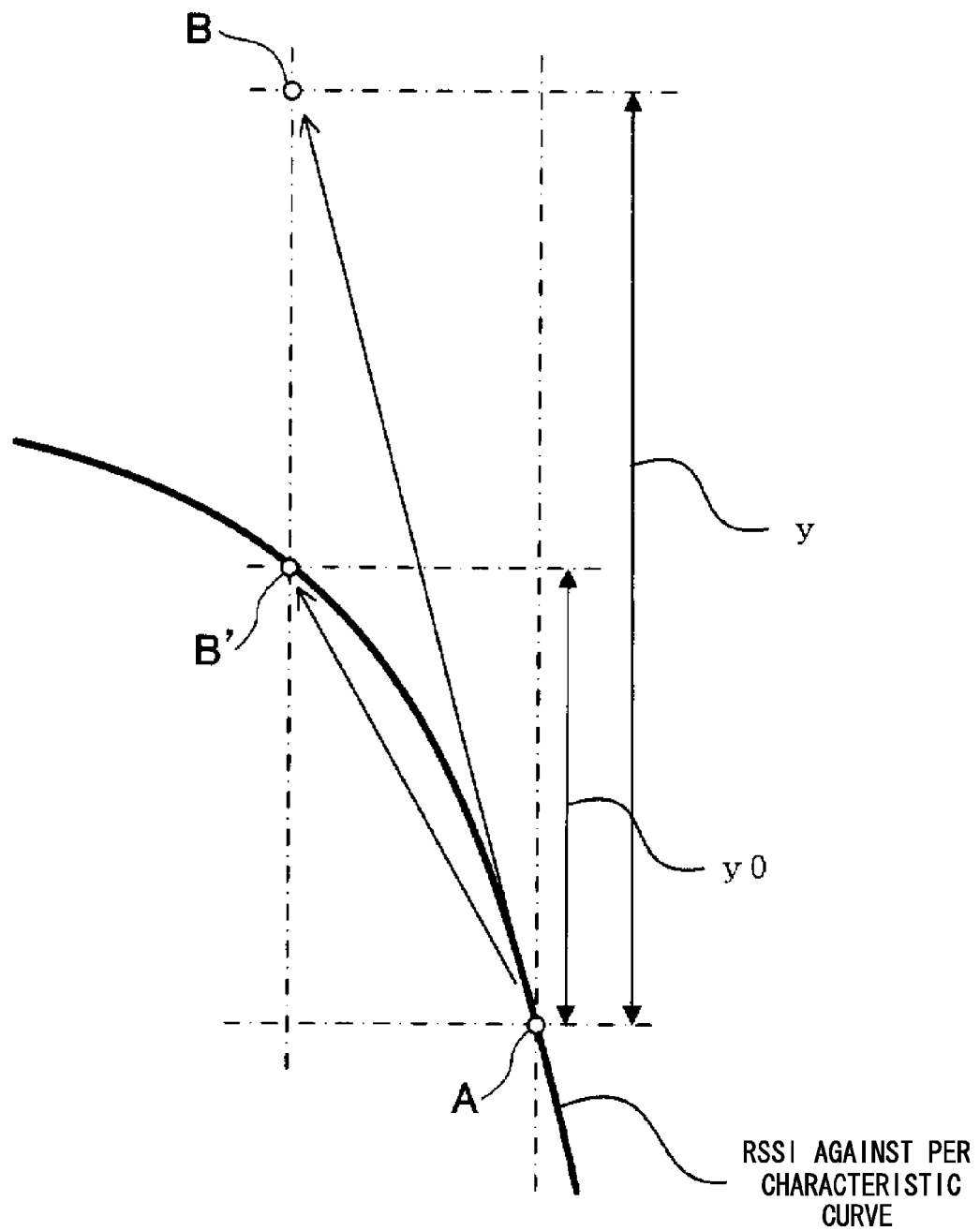
FIG. 9 is a line graph for explaining calculation of a ratio of contribution.

Namely, at step 124, the cause determination section 18 calculates the ratio of contribution in the direction of the packet error rate (radio wave interference) when the position of the point corresponding to the combination of the values of the radio wave reception strength and the packet error rate at the current point in time is offset from the permissible range. As illustrated in FIG. 9, a packet error rate difference between a point A corresponding to the combination of the values of the radio wave reception strength and the packet error rate at the first point in time, and a point B corresponding to the combination of the values of the radio wave reception strength and the packet error rate at the second point in time, is denoted y. The difference between point A and the packet error rate when the point corresponding to the combination of the values of the radio wave reception strength and the packet error rate at the second point in time is positioned on the characteristic curve of the packet error rate against radio wave reception strength (a point B') is denoted $y_0$. In such cases, the ratio of contribution in the direction of the packet error rate (radio wave interference) is found using Equation (4) below.

$$\text{Ratio of contribution of radio wave interference} = (y/y_0) - 1 \quad (4)$$

At the next step 126, the cause determination section 18 determines whether or not the ratio of contribution in the direction of the packet error rate (radio wave interference) calculated at step 124 is a specific value (for example, 0.5 in Equation (4)) or greater. When negative determination is made at step 126, the cause of the offset in the position of the point corresponding to the combination of the values of the radio wave reception strength and the packet error rate at the current time being offset from the permissible range can be determined as mainly being a worsening of the radio wave propagation environment. Processing therefore transitions to step 130, and the cause determination section 18 determines that the cause of interruption occurring in the wireless link (of the packet error rate reaching the threshold value or greater) is a worsening of the radio wave propagation environment.

When affirmative determination is made at step 126, the cause of the position of the point corresponding to the combination of the values of the radio wave reception strength and the packet error rate at the current time being offset from the permissible range can be determined as mainly being radio wave interference. Processing therefore transitions to step 128, and the cause determination section 18 determines that the cause of interruption occurring in the wireless link (of the packet error rate reaching the threshold value or greater) is radio wave interference. Then, in the next step 132, the output section 20 outputs the determination result of the interruption cause made by the cause determination section 18, by, for example, displaying a message on the display section 38, and the wireless communication interruption cause determination processing is ended.

In this manner, the characteristic curve of the packet error rate against radio wave reception strength is estimated so as to pass through the point of the radio wave reception strength at the first point in time that is the specific amount of time earlier than the second point in time when the packet error rate reaches the threshold value or above, and under the assumption that the interference power at the first point in time is maintained. Then, the cause of the interruption is determined based on the positional relationship of the point corresponding to the combination of the values of the radio wave reception strength and the packet error rate at the second point in time, with respect to the estimated characteristic curve of the packet error rate against radio wave reception strength. The precision for determining interruption causes in wireless links can thereby be raised compared to cases in which the interruption cause is determined by comparing the radio wave reception strengths and the packet error rates to respective threshold values.

Namely, even when the interference power I at the first point in time at which the packet error rate was below the threshold value is unclear, it is possible to determine whether the radio wave interference worsened in the time period from the first point in time to the second point in time using the characteristic curve of the packet error rate against radio wave reception strength that passes through the point of the radio wave reception strength and the packet error rate at the first point in time. For example, this enables the immediate interruption cause to be prevented from being mis-determined as radio wave interference, even in cases in which the packet error rate changes to the threshold value or greater mainly due to worsening of the radio wave propagation environment in a state in which the interference power>0.

Explanation has been given in which the wireless communication monitoring server 30 is caused to function as the interruption determination device according to technology disclosed herein. However, technology disclosed herein is not limited thereto, and the wireless communication base stations 68 or the wireless communication terminals 70 may be caused to function as the interruption determination device according to technology disclosed herein.

Moreover, although explanation has been given in which plural characteristic curves of packet error rate against radio wave reception strength having mutually different interference powers are pre-computed and stored in the characteristic curve storage section 14, technology disclosed herein is not limited thereto. For example, the characteristic curve of the packet error rate against signal-to-noise ratio of the receiver may be stored, and the signal-to-noise power ratio SNR may be converted into the received signal strength indicator RSSI using Equation (2) or Equation (3) with an assumed value for the interference power, while repeatedly changing the interference power. Derivation may be thereby performed by calculating the characteristic curve of the packet error rate against radio wave reception strength that passes through the point corresponding to the combination between the values of the radio wave reception strength and the packet error rate at the first point in time, under the assumption that the interference power at the first point in time is maintained.

Figure 10:
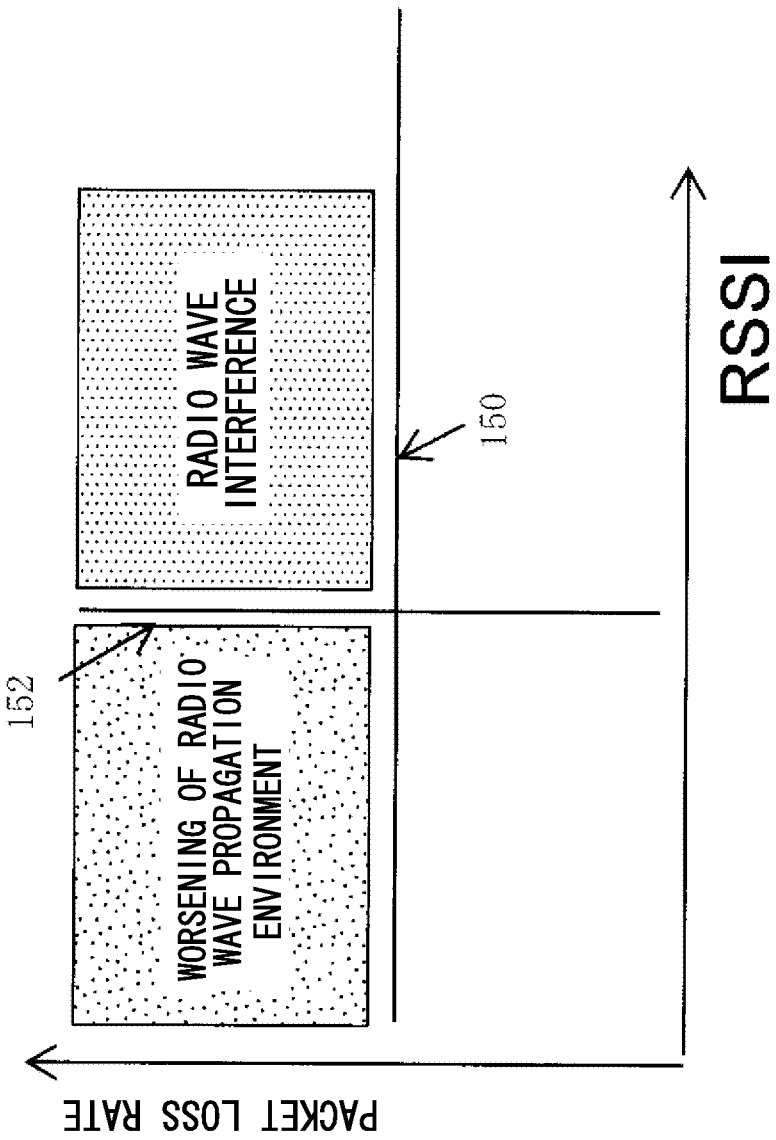
FIG. 10 is a line graph for explaining an outline of the related art.

Sometimes mis-determinations of the interruption cause arise in technology that determines the interruption cause by comparing the radio wave reception strength and the packet error rate against the threshold values 150, 152 (see FIG. 10). Namely, in such technology, even in cases in which radio wave interference has arisen, the point corresponding to the combination of the values of the radio wave reception strength and the packet error rate sometimes lies in the region for determining that the radio wave propagation environment has worsened, as illustrated in FIG. 10. Moreover, in such technology, even in cases in which the radio wave propagation environment has worsened, the point corresponding to the combination of the values of the radio wave reception strength and the packet error rate sometimes lies in the region for determining that there is radio wave interference, as in FIG. 10.

Figure 11:
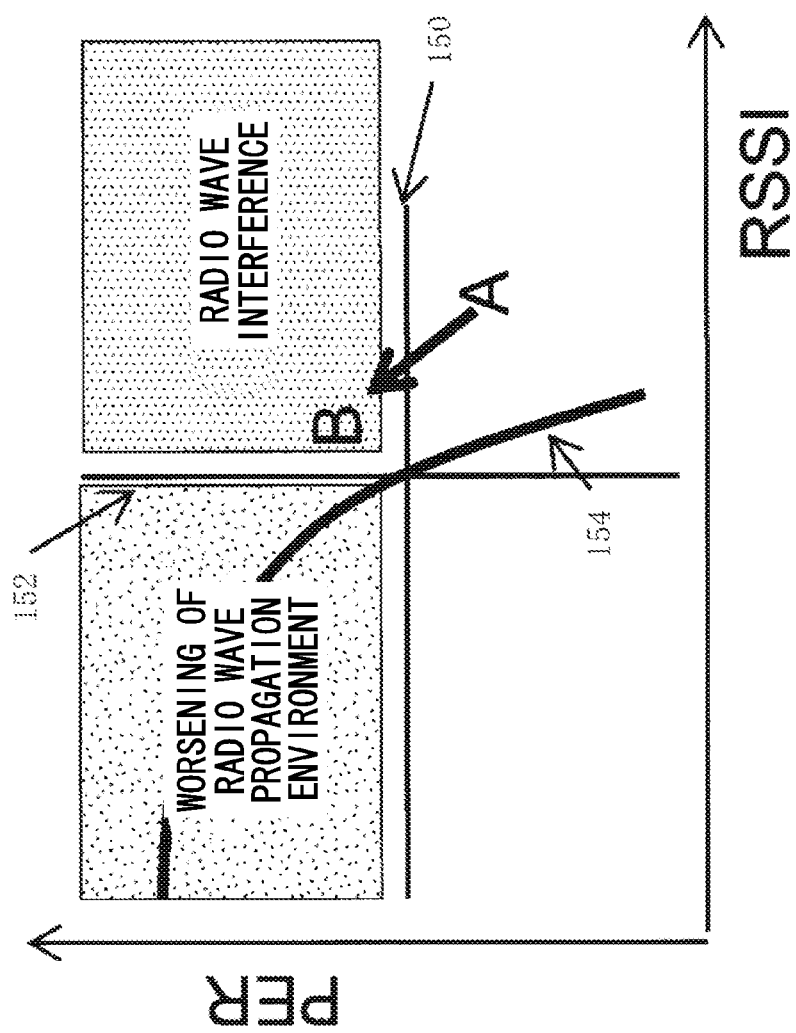
FIG. 11 is a line graph for explaining points of issue in the related art.

In cases in which the interference power is assumed to be constant, the characteristic of the packet error rate against radio wave reception strength depicts a curve 154 like that illustrated in FIG. 11. Therefore, in such technology, as an approach to suppress mis-determination of the interruption cause it would be conceivable to set the threshold value 150 of the radio wave reception strength to a value corresponding to an intersection point between the packet error rate threshold value 152 dictated by system requirements, and the characteristic curve of the packet error rate against radio wave reception strength (see FIG. 11). However, in coordinate space of the packet error rate against radio wave reception strength, the position and shape of the characteristic curve 154 of the packet error rate against radio wave reception strength changes according to the magnitude of the interference power, and since it is not possible to measure the interference power, it is fundamentally difficult to determine the threshold value of the radio wave reception strength as described above.

Moreover, a case is conceivable in which the combination of the values of the radio wave reception strength and the packet error rate has changed from the A point to the B point illustrated in FIG. 11 due to a drop in signal power in a state with a certain amount of radio wave interference. In such cases, in such technology the interruption cause is mis-determined to be radio wave interference irrespective of the immediate interruption cause actually being a drop in signal power.

In contrast thereto, in technology disclosed herein, the precision of determining interruption cause in a wireless link can be raised.

Explanation has been given in of a mode in which the interruption cause determination program 50 is pre-stored (installed) in the storage section 36. However, the interruption cause determination program of technology disclosed herein may be provided in a mode recorded on a non-transitory recording medium such as a CD-ROM or a DVD-ROM.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An interruption cause determination device, comprising:
   a memory; and
   a processor configured to execute a procedure, the procedure including:
      acquiring, in the memory, a radio wave reception strength and a packet error rate of a wireless link;
      estimating a characteristic curve of the packet error rate against the radio wave reception strength while an interference power at a first point in time is maintained over the characteristic curve of the packet error rate against the radio wave reception strength, the characteristic curve of the packet error rate against the radio wave reception strength passing through a first reference point corresponding to a combination of values of the radio wave reception strength and the packet error rate at the first point in time, and the first point in time being a specific amount of time earlier than a second point in time at which the acquired packet error rate of the wireless link reaches a threshold value or greater; and
      determining the cause of interruption based on a position of a second reference point with respect to the estimated characteristic curve of the packet error rate against the radio wave reception strength, the second reference point corresponding to a combination of values of the radio wave reception strength and the packet error rate at the second point in time.

2. The interruption cause determination device of claim 1, wherein a characteristic curve of the packet error rate against the radio wave reception strength is estimated by selecting, from a plurality of characteristic curves of the packet error rate against the radio wave reception strength that have mutually different interference powers and that are derived from characteristic curves of the packet error rate against a signal-to-noise power ratio of the wireless link by converting the signal-to-noise power ratio into the radio wave reception strength under assumptions of mutually different interference powers, the characteristic curve of the packet error rate against the radio wave reception strength that passes through the first reference point.

3. The interruption cause determination device of claim 2, wherein the plurality of characteristic curves of the packet error rate against the radio wave reception strength having mutually different interference powers are pre-stored in the memory.

4. The interruption determination device of claim 1, wherein, in the determination of the interruption cause, the cause of interruption is determined to be a worsening of a radio wave propagation environment when the second reference point is positioned at a position that is less than a specific distance from the estimated characteristic curve of the packet error rate against the radio wave reception strength, and the cause of interruption is determined to be radio wave interference when the second reference point is positioned at a position that is a specific distance or more away from the estimated characteristic curve of the packet error rate against the radio wave reception strength.

5. The interruption cause determination device of claim 4, wherein, in the determination of the cause of interruption, the specific distance is set along a direction parallel to a coordinate axis of the packet error rate based on variation of the packet error rate with respect to a straight line or curve representing an average change of the packet error rate during a time period spanning from the first point in time to the second point in time, and the specific distance is set along a direction parallel to a coordinate axis of the radio wave reception strength based on variation of the radio wave reception strength with respect to a straight line or curve representing an average change of the radio wave reception strength during the time period spanning from the first point in time to the second point in time.

6. The interruption cause determination device of claim 4, wherein, in the determination of the cause of interruption, when the second reference point is positioned at a position that is a specific distance or more from the estimated characteristic curve of the packet error rate against the radio wave reception strength, a ratio of an actual amount of change in the packet error rate during the time period spanning from the first point in time to the second point in time is calculated with an amount of change of the packet error rate during the time period spanning from the first point in time to the second point in time serving as a reference under the assumption that the second reference point is positioned on the characteristic curve, and the cause of interruption is determined to be either worsening of the radio wave propagation environment or radio wave interference based on a result of comparing the calculated ratio against a threshold value.

7. The interruption cause determination device of claim 1, wherein, in the estimation of the characteristic curve of the packet error rate against the radio wave reception strength, a straight line or curve is computed representing average change in the packet error rate or in the radio wave reception strength during the time period spanning from the first point in time to the second point in time, and a combination of the values of the radio wave reception strength and the packet error rate corresponding to a point that is near the first point in time and that is on the computed straight line or the computed curve is employed as the first reference point.

8. The interruption cause determination device of claim 7, wherein, in the estimation of the characteristic curve of the radio wave reception strength and the packet error rate, when the gradient of the computed straight line or the computed curve is less than a specific value, the first point in time is set to a time that is earlier than the second point in time by an amount of time that is a constant amount of time added to the specific amount of time.

9. An interruption cause determination method, comprising, by a processor:
   acquiring, in a memory, a radio wave reception strength and a packet error rate of a wireless link;
   estimating a characteristic curve of the packet error rate against the radio wave reception strength while an interference power at a first point in time is maintained over the characteristic curve of the packet error rate against the radio wave reception strength, the characteristic curve of the packet error rate against the radio wave reception strength passing through a first reference point corresponding to a combination of values of the radio wave reception strength and the packet error rate at the first point in time, and the first point in time being a specific amount of time earlier than a second point in time at which the acquired packet error rate of the wireless link reaches a threshold value or greater; and determining the cause of interruption based on a position of a second reference point with respect to the estimated characteristic curve of the packet error rate against the radio wave reception strength, the second reference point corresponding to a combination of values of the radio wave reception strength and the packet error rate at the second point in time.

10. The interruption cause determination method of claim 9, wherein a characteristic curve of the packet error rate against radio wave reception strength is estimated by selecting, from a plurality of characteristic curves of the packet error rate against the radio wave reception strength that have mutually different interference powers and that are derived from characteristic curves of the packet error rate against a signal-to-noise power ratio of the wireless link by converting the signal-to-noise power ratio into the radio wave reception strength under assumptions of mutually different interference powers, the characteristic curve of the packet error rate against the radio wave reception strength that passes through the first reference point.

11. The interruption cause determination method of claim 10, wherein the plurality of characteristic curves of the packet error rate against the radio wave reception strength having mutually different interference powers are pre-stored in the memory.

12. The interruption cause determination method of claim 9, wherein the cause of interruption is determined to be a worsening of a radio wave propagation environment when the second reference point positioned at a position that is less than a specific distance from the estimated characteristic curve of the packet error rate against the radio wave reception strength, and the cause of interruption is determined to be radio wave interference when the second reference point is positioned at a position that is a specific distance or more away from the estimated characteristic curve of the packet error rate against the radio wave reception strength.

13. The interruption cause determination method of claim 12, wherein the specific distance is set along a direction parallel to a coordinate axis of the packet error rate based on variation of the packet error rate with respect to a straight line or curve representing an average change of the packet error rate during a time period spanning from the first point in time to the second point in time, and the specific distance is set along a direction parallel to a coordinate axis of the radio wave reception strength based on variation of the radio wave reception strength with respect to a straight line or curve representing an average change of the radio wave reception strength during the time period spanning from the first point in time to the second point in time.

14. The interruption cause determination method of claim 12, wherein, when the second reference point is positioned at a position that is a specific distance or more from the estimated characteristic curve of the packet error rate against the radio wave reception strength, a ratio of an actual amount of change in the packet error rate during the time period spanning from the first point in time to the second point in time is calculated with an amount of change of the packet error rate during the time period spanning from the first point in time to the second point in time serving as a reference under the assumption that the second reference point is positioned on the characteristic curve, and the cause of interruption is determined to be either worsening of the radio wave propagation environment or radio wave interference based on a result of comparing the calculated ratio against a threshold value.

15. A non-transitory recording medium storing a program that causes a computer to execute a process, the process comprising:

acquiring, in a memory, a radio wave reception strength and a packet error rate of a wireless link;

estimating a characteristic curve of the packet error rate against the radio wave reception strength while an interference power at a first point in time is maintained over the characteristic curve of the packet error rate against the radio wave reception strength, the characteristic curve of the packet error rate against the radio wave reception strength passing through a first reference point corresponding to a combination of values of the radio wave reception strength and the packet error rate at the first point in time, and the first point in time being a specific amount of time earlier than a second point in time at which the acquired packet error rate of the wireless link reaches a threshold value or greater; and determining the cause of interruption based on a position of a second reference point with respect to the estimated characteristic curve of the packet error rate against the radio wave reception strength, the second reference point corresponding to a combination of values of the radio wave reception strength and the packet error rate at the second point in time.

16. The non-transitory recording medium of claim 15, wherein a characteristic curve of the packet error rate against radio wave reception strength is estimated by selecting, from a plurality of characteristic curves of the packet error rate against the radio wave reception strength that have mutually different interference powers and that are derived from characteristic curves of the packet error rate against a signal-to-noise power ratio of the wireless link by converting the signal-to-noise power ratio into the radio wave reception strength under assumptions of mutually different interference powers, the characteristic curve of the packet error rate against the radio wave reception strength that passes through the first reference point.

17. The non-transitory recording medium of claim 16, wherein the plurality of characteristic curves of the packet error rate against the radio wave reception strength having mutually different interference powers are pre-stored.

18. The non-transitory recording medium of claim 15, wherein the cause of interruption is determined to be a worsening of a radio wave propagation environment when the second reference point is positioned at a position that is less than a specific distance from the estimated characteristic curve of the packet error rate against the radio wave reception strength, and the cause of interruption is determined to be radio wave interference when the second reference point is positioned at a position that is a specific distance or more away from the estimated characteristic curve of the packet error rate against the radio wave reception strength.

19. The non-transitory recording medium of claim 18, wherein the specific distance is set along a direction parallel to a coordinate axis of the packet error rate based on variation of the packet error rate with respect to a straight line or curve representing an average change of the packet error rate during a time period spanning from the first point in time to the second point in time, and the specific distance is set along a direction parallel to a coordinate axis of the radio wave reception strength based on variation of the radio wave reception strength with respect to a straight line or curve representing an average change of the radio wave reception strength during the time period spanning from the first point in time to the second point in time.

20. The non-transitory recording medium of claim 18, wherein when the second reference point is positioned at a position that is a specific distance or more from the estimated characteristic curve of the packet error rate against the radio wave reception strength, a ratio of an actual amount of change in the packet error rate during the time period spanning from the first point in time to the second point in time is calculated with an amount of change of the packet error rate during the time period spanning from the first point in time to the second point in time serving as a reference under the assumption that the second reference point is positioned on the characteristic curve, and the cause of interruption is determined to be either worsening of the radio wave propagation environment or radio wave interference based on a result of comparing the calculated ratio against a threshold value.

\* \* \* \* \*